(12) United States Patent
Hyun

(10) Patent No.: US 11,985,401 B2
(45) Date of Patent: May 14, 2024

(54) CAMERA MODULE AND ELECTRONIC DEVICE

(71) Applicant: SAMSUNG ELECTRO-MECHANICS CO., LTD., Suwon-si (KR)

(72) Inventor: Hae Seung Hyun, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 17/836,585

(22) Filed: Jun. 9, 2022

(65) Prior Publication Data
US 2023/0010273 A1  Jan. 12, 2023

(30) Foreign Application Priority Data

Jul. 12, 2021 (KR) .......................... 10-2021-0090952

(51) Int. Cl.
H04N 23/51 (2023.01)
G03B 17/17 (2021.01)
H04N 23/53 (2023.01)
H04N 23/54 (2023.01)
H04N 23/55 (2023.01)

(52) U.S. Cl.
CPC ............. *H04N 23/51* (2023.01); *G03B 17/17* (2013.01); *H04N 23/531* (2023.01); *H04N 23/54* (2023.01); *H04N 23/55* (2023.01)

(58) Field of Classification Search
CPC ........ G03B 17/04; G03B 17/17; G03B 30/00; G06F 1/1624; G06F 1/1652; G06F 1/1686; H04N 23/51; H04N 23/531; H04N 23/54; H04N 23/55; H04N 23/90
See application file for complete search history.

(56) References Cited

U.S. PATENT DOCUMENTS

| 7,680,404 | B2 * | 3/2010 | Schack ................. G06F 1/1675 455/90.3 |
| 10,785,353 | B1 * | 9/2020 | Li ........................ H04M 1/0264 |
| 11,252,826 | B2 * | 2/2022 | Park ....................... H05K 1/028 |
| 2007/0009247 | A1 * | 1/2007 | Maeda ................... G02B 7/102 348/E5.025 |

(Continued)

FOREIGN PATENT DOCUMENTS

| JP | 2003-163824 A | 6/2003 |
| JP | 2006-49936 A | 2/2006 |

(Continued)

OTHER PUBLICATIONS

Korean Office Action dated Aug. 9, 2022, in counterpart Korean Patent Application No. 10-2021-0090952 (5 Pages in Korean, 7 pages in English).

*Primary Examiner* — Amy R Hsu
(74) *Attorney, Agent, or Firm* — NSIP Law

(57) ABSTRACT

A camera module having a first housing including an image sensor converting an optical signal into an electrical signal, and a second housing including an imaging optical system focusing the optical signal on the image sensor and a first optical path conversion member disposed on an object-side surface of the imaging optical system and converting an optical path, and carried into or carried out of the first housing in a state of being coupled to the first housing.

20 Claims, 21 Drawing Sheets

(56) References Cited

U.S. PATENT DOCUMENTS

| | | | |
|---|---|---|---|
| 2009/0086337 A1* | 4/2009 | Kondo | G03B 3/10 |
| | | | 359/700 |
| 2016/0179141 A1* | 6/2016 | Kim | G09F 9/301 |
| | | | 361/749 |
| 2017/0139225 A1 | 5/2017 | Lim | |
| 2019/0261519 A1* | 8/2019 | Park | G06F 1/1677 |
| 2019/0384438 A1* | 12/2019 | Park | G06F 3/0482 |
| 2020/0204740 A1* | 6/2020 | Tallaron | G02B 7/09 |
| 2020/0326754 A1* | 10/2020 | Kim | G09F 9/301 |
| 2022/0311846 A1* | 9/2022 | Kwak | H04M 1/0241 |
| 2023/0205274 A1* | 6/2023 | Lee | G06F 1/1637 |
| | | | 361/679.01 |

FOREIGN PATENT DOCUMENTS

| | | |
|---|---|---|
| JP | 2007-142935 A | 6/2007 |
| KR | 10-0506988 B1 | 8/2005 |
| KR | 10-2016-0077316 A | 7/2016 |
| KR | 10-2017-0056387 A | 5/2017 |
| KR | 10-2019-0026782 A | 3/2019 |
| KR | 10-2019-0141518 A | 12/2019 |
| KR | 10-2020-0022489 A | 3/2020 |
| WO | WO 2018/154421 A1 | 8/2018 |

\* cited by examiner

II – II

IV-IV

IV- IV

VI – VI

CAMERA MODULE AND ELECTRONIC DEVICE

CROSS-REFERENCE TO RELATED APPLICATIONS

This application claims the benefit under 35 USC 119(a) of Korean Patent Application No. 10-2021-0090952 filed on Jul. 12, 2021, in the Korean Intellectual Property Office, the entire disclosure of which is incorporated herein by reference for all purposes.

BACKGROUND

1. Field

The present disclosure relates to a camera module capable of telephoto imaging, and an electronic device including the same.

2. Description of the Background

A small electronic device may include a camera module. For example, a portable terminal such as a smartphone may include the camera module disposed on its front or rear surface. A size of the camera module may usually be influenced by a thickness or the like of the portable terminal. For example, a distance from a foremost lens of the camera module to an image sensor thereof is unable to be greater than the thickness of the portable terminal. For example, it may be difficult for the camera module for a portable terminal to include an imaging optical system having a long focal length, and the (telephoto) imaging of a distant subject may thus be difficult.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a first housing including an image sensor converting an optical signal into an electrical signal, and a second housing including an imaging optical system focusing the optical signal on the image sensor and a first optical path conversion member disposed on an object-side surface of the imaging optical system and converting an optical path, and carried into or carried out of the first housing in a state of being coupled to the first housing.

The imaging optical system may have a focal length "f" varied by a movement of the second housing.

The first housing and the second housing may have lengths different from each other in a direction of an optical axis of the imaging optical system.

The imaging optical system may include a lens having an effective radius in a first direction intersecting the optical axis and an effective radius in a second direction intersecting the optical axis and the first direction, which are different from each other.

The first housing may include a second optical path conversion member.

An electronic device may include the camera module.

The electronic device may further include a first body connected to the first housing, and having a first region of a display member, and a second body movably disposed relative to the first body, and having a second region of the display member, wherein the second region may expose a greater area of the display member when the second body is moved away from the first body.

The second body may be connected to the second housing.

In another general aspect, an electronic device includes a first body including a first region of a display member, a second body having a variable distance from the first body and including a second region of the display member, and a camera module including a first housing connected to the first body, and a second housing connected to the second body and carried into or carried out of the first housing, based on a position of the second body, wherein the first housing includes an image sensor converting an optical signal into an electrical signal, and the second housing includes an imaging optical system focusing the optical signal on the image sensor and a first optical path conversion member converting a path of light incident in an opening of the second housing to the imaging optical system.

The second body may include a wound member wound at the second region of the display member.

The wound member may include a roll member connected to one end of the display member and capable of performing a rotational movement based on a fixed axis, and an elastic member providing an inertial force for rotating the roll member in one direction.

The second region of the display member may be an elastic member providing an inertial force for rotating the second region of the display member in one direction.

The electronic device may further include a third body having a variable distance from the first body and may include a third region of the display member.

The imaging optical system may include a lens having an effective radius in a first direction intersecting an optical axis and an effective radius in a second direction intersecting the optical axis and the first direction, which are different from each other.

The second housing may include a second optical path conversion member.

In another general aspect, a camera module includes a first housing, a second housing comprising a window, and an imaging optical system comprising one or more lenses disposed in the second housing or the first and second housings, focusing incident light through the window on an image sensor of the first housing, wherein the second housing is carried into or carried out of the first housing in a state of being coupled to the first housing.

The camera module may further include a first optical path conversion member converting a path of light incident in the window of the second housing to the imaging optical system.

A focal length "f" of the imaging optical system may be varied by movement of the second housing relative to the first housing.

An electronic device may include the camera module, a first body connected to the first housing, and including a first region of a display member, and a second body movably disposed relative to the first body, and comprising a second region of the display member, wherein the second region unwinds to expose the second region when the second body is moved away from the first body and winds up to store the second region when the second body is moved towards the first body.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
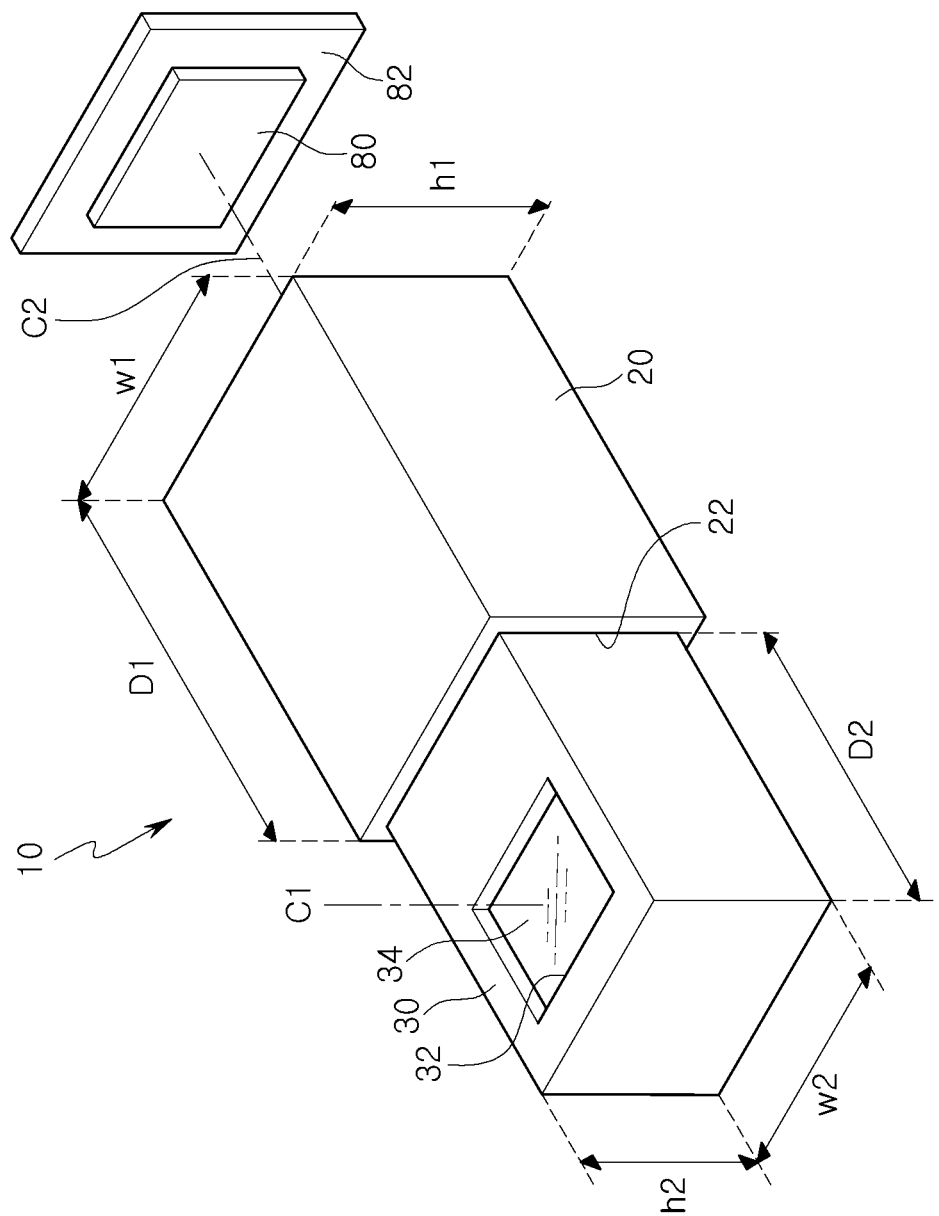
FIG. 1 is a perspective view of a camera module according to an example embodiment.

Hereinafter, while examples of the present disclosure will be described for example with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a camera module capable of telephoto imaging, and an electronic device including the same.

A camera module in the present specification may be mounted on an electronic device. For example, the camera module may be mounted on a portable terminal, a laptop computer, a virtual reality (VR) device, an augmented reality (AR) device, glasses, or the like.

The camera module in the present specification may have a length variable in a direction of an optical axis. For example, a distance from one end to the other end of the camera module may be adjusted as needed. For example, the distance from one end of the camera module to the other end may be a maximum when the camera module is in a driving state or in telephoto imaging, and may be a minimum when the camera module is in a non-driving state or in wide-angle imaging.

The camera module may include a first housing and a second housing. The first housing and the second housing may separately accommodate main components of the camera module. For example, the first housing may accommodate an image sensor, and the second housing may accommodate an optical path conversion member and an imaging optical system.

The first housing and the second housing may enable the camera module to have the variable length. For example, the second housing may be carried into the first housing or carried out of the first housing, thereby varying an overall length of the camera module.

The electronic device in the present specification may include all portable devices. For example, the electronic device may be the portable terminal, the laptop computer, the VR device, the AR device, a camera device integrally formed with the glasses or the like.

The electronic device in the present specification may include a display member. For example, the electronic device may include the display member visually showing an external signal to a user or to convert the user's input signal to an electrical signal.

The electronic device may change a size of the display member. For example, the electronic device may carry a partial region of the display member into the electronic device or carry out (or expose) the corresponding region externally from the electronic device as needed.

The electronic device may include the above-described camera module. For example, the electronic device may include the camera module having the variable length in the direction of the optical axis. The camera module may have the variable length based on the size of the display member. For example, the length of the camera module may be reduced when the partial region of the display member is carried into the electronic device, and extended when the corresponding region of the display member is carried out of the electronic device.

Hereinafter, example embodiments in the present disclosure will now be described in detail with reference to the accompanying drawings.

Figure 2:
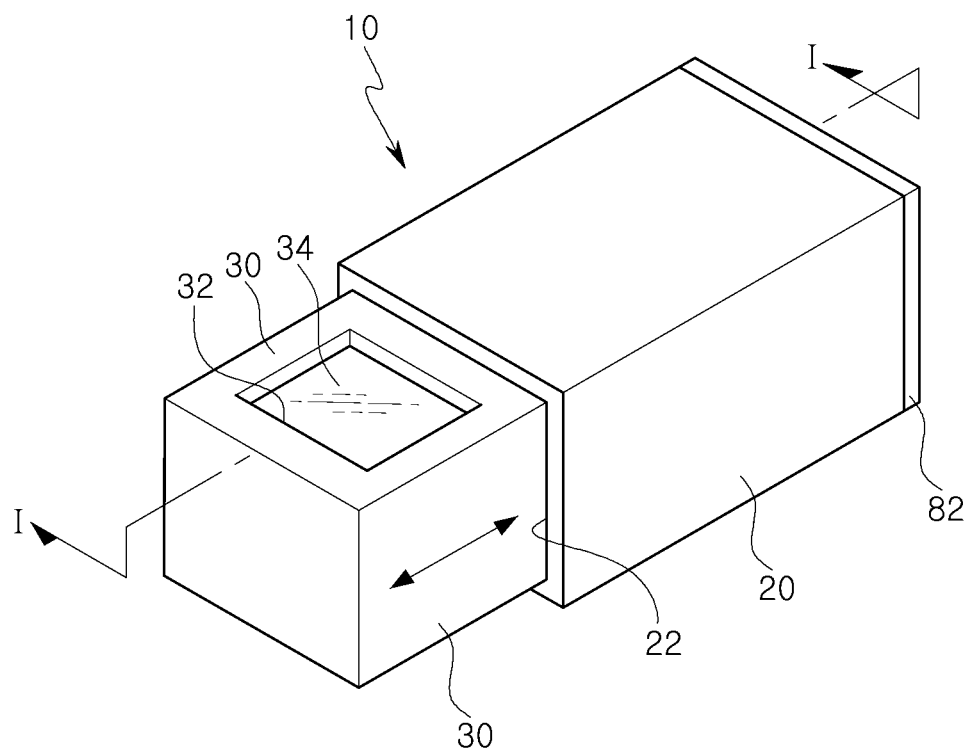
FIG. 2 is a view illustrating an operating state of the camera module illustrated in FIG. 1.

First, a camera module according to an example embodiment is described with reference to FIGS. 1, 2, and 3.

A camera module 10 may include a first housing 20 and a second housing 30.

The first housing 20 and the second housing 30 may be disposed in one direction. For example, the first housing 20 and the second housing 30 may be sequentially disposed in a direction intersecting a first optical axis C1. The first housing 20 and the second housing 30 may have sizes different from each other. For example, a height h1 and a width w1 of the first housing 20 may be greater than a height h2 and a width w2 of the second housing 30. The first housing 20 and the second housing 30 may have lengths different from each other in a direction of a second optical axis C2 of an imaging optical system 60. For example, a length D1 of the first housing 20 may be greater than a length D2 of the second housing 30.

The first housing 20 and the second housing 30 may form a plurality of optical paths. For example, a window 32 of the second housing 30 may enable a first optical path to be formed, and an inner space of each of the first housing 20 and the second housing 30 may enable a second optical path to be formed. The first optical path may be formed by light incident through the window 32 of the second housing 30, and the second optical path may be formed by light moved along the inside of each of the first housing 20 and the second housing 30. For example, the first optical path may be generally formed in a direction in which the window 32 is open, and the second optical path may be formed in a length direction of each of the first housing 20 and the second housing 30. The first optical path and the second optical path may be formed in directions intersecting each other. For example, the first optical axis C1 of the first optical path and the second optical axis C2 of the second optical path may form a substantially right angle.

The second housing 30 may include a component preventing an introduction of a foreign material. For example, a protection cover 34 may be formed on the window 32 of the second housing 30. The protection cover 34 may completely close the window 32 to prevent the foreign material from being introduced into the second housing 30. The protection cover 34 may be made of a material capable of transmitting light. For example, the protection cover 34 may be made of a transparent glass material. However, the material of the protection cover 34 is not limited to the glass. For example, the protection cover 34 may be made of a transparent plastic material. The protection cover 34 may transmit light of substantially all wavelengths. For example, the protection cover 34 may allow all of ultraviolet, visible, and infrared light to pass therethrough. However, the protection cover 34 may block light of some wavelengths when necessary. For example, the protection cover 34 may block the infrared light.

The first housing 20 and the second housing 30 may adjust the length of the camera module 10 or a length of the optical path. For example, as illustrated in FIG. 2, the second housing 30 may be carried into the first housing 20 or may be carried out of the first housing 20. The first housing 20 may accommodate the second housing 30 therein. For example, the height and width of an opening 22 of the first housing 20 may be substantially equal to the height h2 and the width w2 of the second housing 30, or greater than the height h2 and the width w2 of the second housing 30.

Next, a detailed configuration of the camera module 10 is described with reference to FIGS. 3 and 4.

The camera module 10 may include components necessary for imaging a subject. For example, the camera module 10 may include the imaging optical system 60, an image sensor 80, etc. The camera module 10 may further include a component converting the optical path of the camera module 10 in order to be mounted on a small electronic device. For example, the camera module 10 may further include a first optical path conversion member 52. However, the camera module 10 is not limited to including the above-mentioned members. For example, the camera module 10 may further include a shielding member (not illustrated) blocking a harmful wave, a connection terminal connecting the camera module with an external electronic device, etc.

Figure 3:
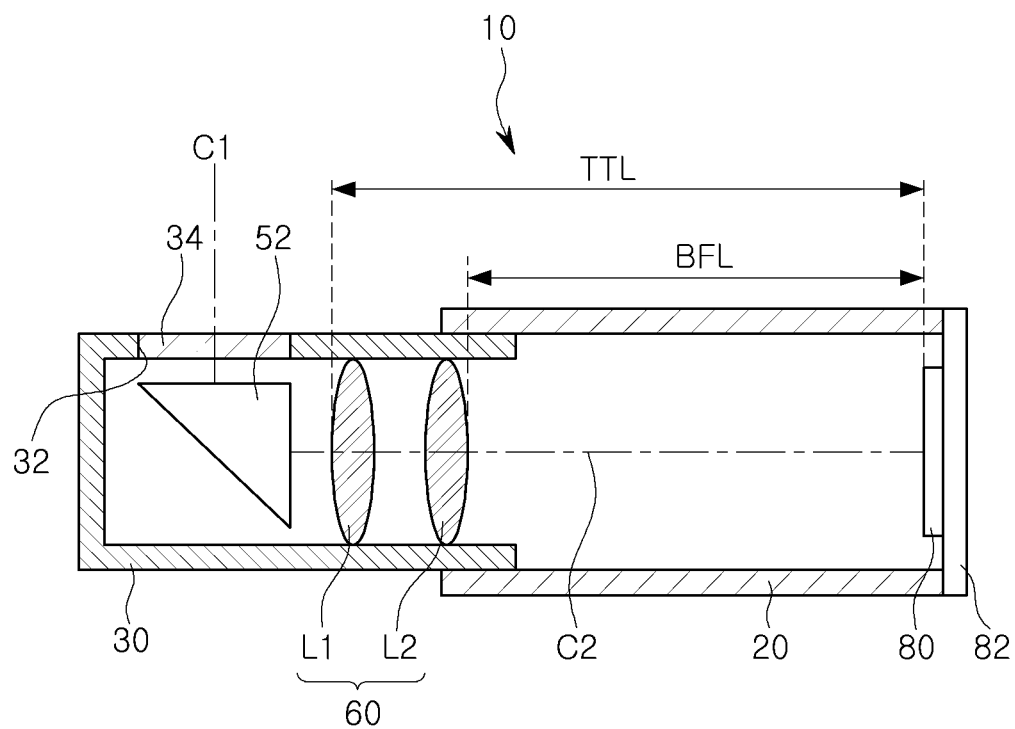
FIG. 3 is a cross-sectional view of the camera module illustrated in FIG. 1.

The components of the camera module 10 may be separately accommodated in the first housing 20 and the second housing 30 as illustrated in FIG. 3. For example, the first housing 20 may accommodate the image sensor 80, and the second housing 30 may accommodate the imaging optical system 60 and the first optical path conversion member 52.

The first optical path conversion member 52, the imaging optical system 60 and the image sensor 80 may be disposed on the same optical path. For example, the first optical path conversion member 52, the imaging optical system 60 and the image sensor 80 may be sequentially disposed at intervals along the second optical axis C2.

Next, examples of the above-mentioned components are described in detail.

The first optical path conversion member 52 may be disposed near the window 32 and may convert the optical path. For example, the first optical path conversion member 52 may convert a path of light incident along the first optical axis C1 to the direction of the second optical axis C2. The first optical path conversion member 52 may reflect light or refract light. For example, the first optical path conversion member 52 may have a shape of a mirror capable of reflecting light or a shape of a prism capable of refracting light.

The imaging optical system 60 may image light incident on the image sensor 80. The imaging optical system 60 may include one or more lenses L1 and L2. For example, the imaging optical system 60 may include the first lens L1 and the second lens L2 each having refractive power. However, the number of lenses included in the imaging optical system 60 is not limited to two. For example, the imaging optical system 60 may include three or more lenses. The imaging optical system 60 may have a predetermined optical characteristic. For example, the imaging optical system 60 may have a long focal length. For example, a focal length "f" of the imaging optical system 60 may be greater than a distance of a total track length (TTL) from an object-side surface of the lens L1 positioned at a forefront of the imaging optical system to an image-side surface or the image sensor 80. For another example, the imaging optical system 60 may have a long rear focal length (i.e., BFL, a distance from an image-side surface of the rearmost lens L2 to the image-side surface or the image sensor).

The imaging optical system 60 may have the variable focal length. For example, the focal length "f" of the imaging optical system 60 may be varied by a movement of the second housing 30. For a specific example, the focal length "f" of the imaging optical system 60 may be reduced as the second housing 30 is carried into the first housing 20, and increased as the second housing 30 is carried out of the first housing 20.

The image sensor 80 may have the image-side surface on which light incident through the imaging optical system 60 may be imaged. The image sensor 80 may convert a signal of light incident through the imaging optical system 60 into an electrical signal. For example, the image sensor 80 may be a complementary metal-oxide-semiconductor (CMOS).

The camera module 10 may further include a member processing the electrical signal of the image sensor 80. For example, the camera module 10 may further include a board 82 on which a passive element is mounted. The image sensor 80 may be electrically connected to an electronic component mounted on the board 82. For example, the image sensor 80 may be mounted on one surface of the board 82 to be electrically connected to the electronic component on the board 82.

It may be easy to make the camera module 10 according to this example embodiment have a smaller thickness. For example, each of the first housing 20 and the second housing 30 of the camera module 10 may have a length in a first direction intersecting the second optical axis C2 and a length in a second direction intersecting the second optical axis C2 and the first direction, which are different from each other. For example, each cross section of the first housing 20 and the second housing 30 may have a substantially rectangular shape.

For another example, the camera module 10 may minimize a size of the imaging optical system 60 in a direction of the first optical axis C1. For example, the imaging optical system 60 may include one or more lenses L1 and L2 each having a length in the first direction intersecting the second optical axis C2 and a length in the second direction which are different from each other.

Figure 4:
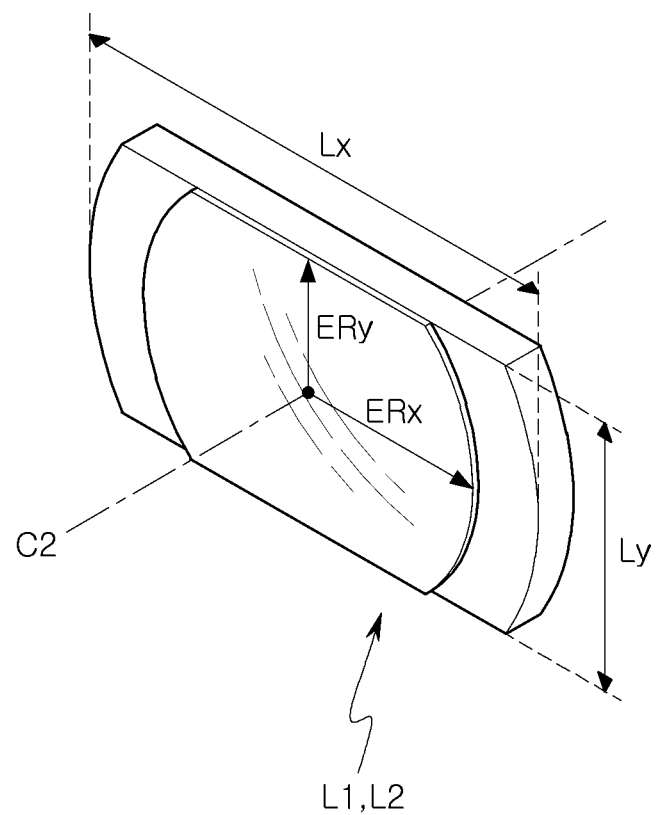
FIG. 4 shows a type of a lens included in the camera module according to an example embodiment.

As illustrated in FIG. 4, the lenses L1 and L2 may be generally formed in an elliptical shape or a shape in which the lens has a long length in a direction and a short length in another direction. For example, an effective radius ERx of the lens L1 or L2 in the first direction may be greater than its effective radius ERy in the second direction. For another example, a length Lx of the lens L1 or L2 in the first direction may be greater than its length Ly in the second direction. A ratio (ERy/ERx) of the effective radius ERx in the first direction and the effective radius ERy in the second direction may be greater than 0.6 and less than 1.0. However, a size ratio of ERy/ERx is not limited to between 0.6 and 1.0.

The imaging optical system 60 including the lenses L1 and L2 each having the above shape may make it possible for the camera module 10 to have a smaller thickness without lowering its optical performance.

Figure 5:
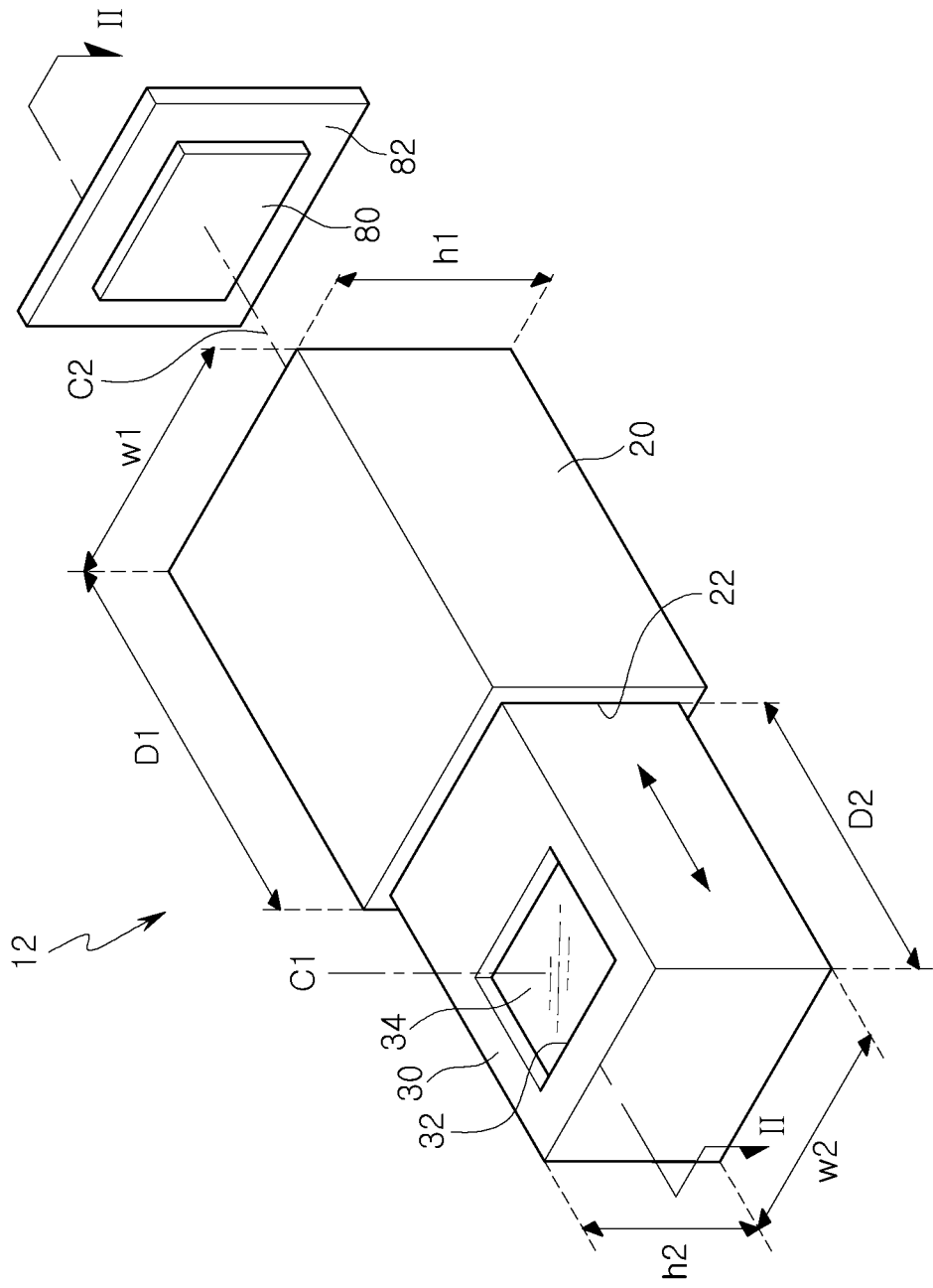
FIG. 5 is a perspective view of a camera module according to another example embodiment.

Next, a camera module according to another example embodiment is described with reference to FIGS. 5 and 6.

A camera module 12 according to this example embodiment may include the first housing 20 and the second housing 30. However, the camera module 12 is not limited to including the first housing 20 and the second housing 30. For example, the camera module 12 may further include the board 82 on which the image sensor 80 is mounted.

The first housing 20 and the second housing 30 may have the sizes different from each other. For example, the cross section of the first housing 20 may be greater than the cross section of the second housing 30. For example, the height h1 and width w1 of the first housing 20 may be greater than the height h2 and width w2 of the second housing 30.

The camera module 12 may have a variable length in the direction of the optical axis. For example, a distance from an end of the first housing 20 to an end of the second housing 30 may be extended or reduced as needed. For example, the distance from the end of the first housing 20 to the end of the second housing 30 may be reduced as the second housing 30 is carried into the first housing 20 through the opening 22 of the first housing 20. For another example, the distance from the end of the first housing 20 to the end of the second housing 30 may be extended as the second housing 30 is carried out of the inside of the first housing 20 through the opening 22 of the first housing 20.

The second housing 30 may allow light reflected from the subject to be incident thereon. For example, the window 32 on which light may be incident may be formed on one surface of the second housing 30. The protection cover 34 may be disposed on the window 32. The protection cover 34 may be made of a transparent material that allows light to pass through, and may block the introduction of the foreign material by using the window 32. The protection cover 34 may be made of the glass or the plastic material. However, the material of the protection cover 34 is not limited to the glass or the plastic material.

The camera module 12 may include a component necessary for imaging and capturing the subject. For example, the camera module 12 may include the first optical path conversion member 52, the imaging optical system 60 and the image sensor 80.

Figure 6:
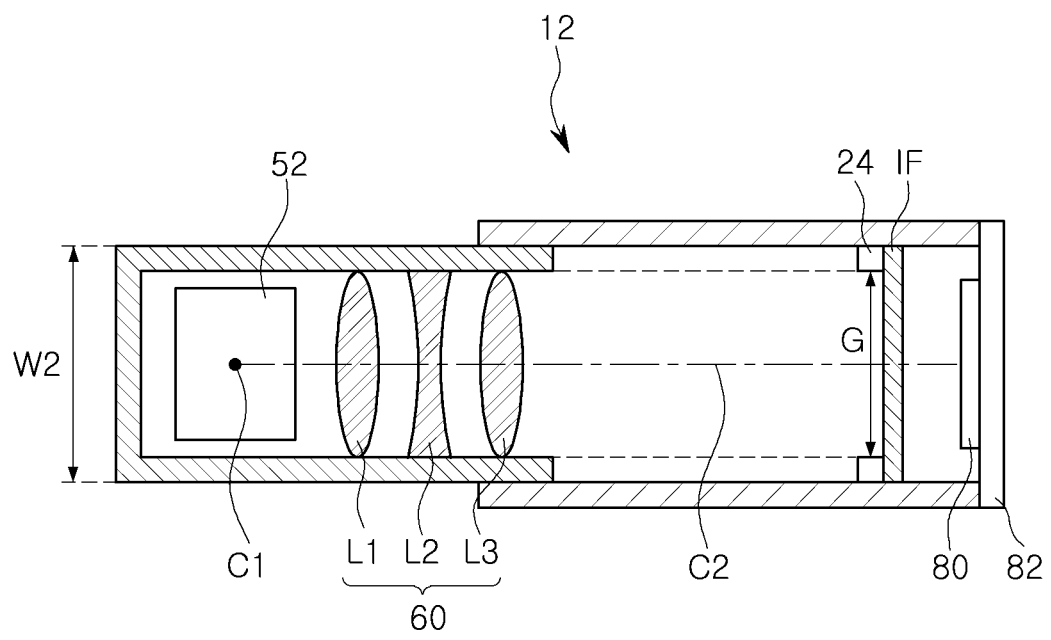
FIG. 6 is a cross-sectional view of the camera module illustrated in FIG. 5.

The first optical path conversion member 52, the imaging optical system 60 and the image sensor 80 may be disposed in the first housing 20 or the second housing 30 as illustrated in FIG. 6. For example, the first optical path conversion member 52 and the imaging optical system 60 may be disposed in the second housing 30, and the image sensor 80 may be disposed in the first housing 20.

The first optical path conversion member 52, the imaging optical system 60 and the image sensor 80 may be disposed on the same optical path. For example, the first optical path conversion member 52, the imaging optical system 60 and the image sensor 80 may be sequentially disposed at intervals along the second optical axis C2.

The first optical path conversion member 52 may convert the optical path. For example, the first optical path conversion member 52 may convert the path of light incident along the first optical axis C1 to the direction of the second optical axis C2. The first optical path conversion member 52 may reflect light or refract light. For example, the first optical path conversion member 52 may have the shape of a mirror capable of reflecting light or the shape of a prism capable of refracting light.

The imaging optical system 60 may image light incident on the image sensor 80. The imaging optical system 60 may include one or more lenses L1, L2, and L3. For example, the imaging optical system 60 may include the first lens L1, the second lens L2, and the third lens L3, each having a positive or negative refractive power. However, the number of lenses included in the imaging optical system 60 is not limited to three. For example, the imaging optical system 60 may include four or more lenses. The imaging optical system 60 may have the predetermined optical characteristic. For example, the imaging optical system 60 may image the subject positioned at a long distance. For another example, the imaging optical system 60 may adjust a focus magnification (i.e., zoom function).

The image sensor 80 may form the image-side surface on which light incident through the imaging optical system 60 may be imaged. The image sensor 80 may convert the signal of light incident through the imaging optical system 60 to the electrical signal. For example, the image sensor 80 may be the complementary metal-oxide-semiconductor (CMOS).

The camera module 12 may further include the member processing the electrical signal of the image sensor 80. For example, the camera module 12 may further include the board 82 on which the passive element is mounted. The image sensor 80 may be electrically connected to the electronic component mounted on the board 82. For example, the image sensor 80 may be mounted on one surface of the board 82 to be electrically connected to the electronic component on the board 82.

The camera module 12 according to this example embodiment may include a member defining a position of the carried-in second housing 30. For example, a step 24 may be formed in the first housing 20. The step 24 may protrude in a direction intersecting the second optical axis C2, and may form a space to which a filter member IF may be attached. The step 24 may be brought into contact with the end of the second housing 30. For example, an interval G between the steps 24 may be smaller than the width w2 of the second housing 30. Therefore, when the second housing 30 is about to be excessively carried into the first housing 20, the step 24 may prevent the second housing 30 from being excessively carried into the first housing by being brought into contact with the second housing 30, and prevent the second housing 30 from colliding with the image sensor 80 or the filter member IF.

Figure 8:
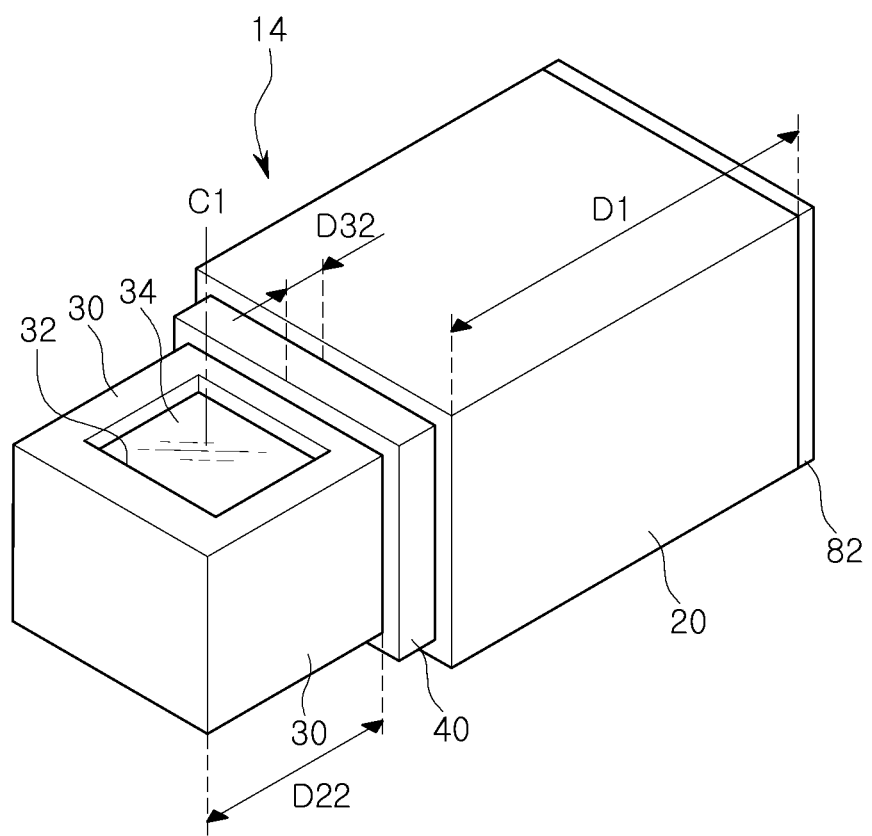
FIG. 8 is a view illustrating an operating state of the camera module illustrated in FIG. 7.
Figure 9:
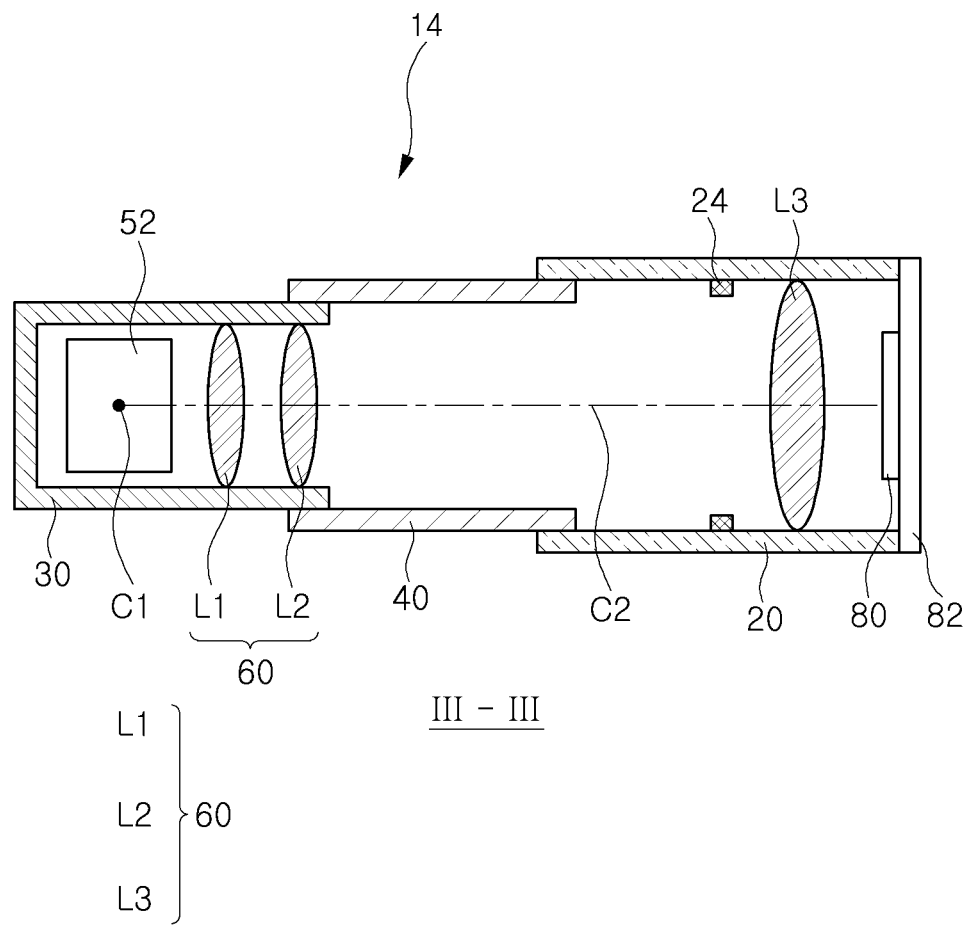
FIG. 9 is a cross-sectional view of the camera module illustrated in FIG. 7.
Figure 10:
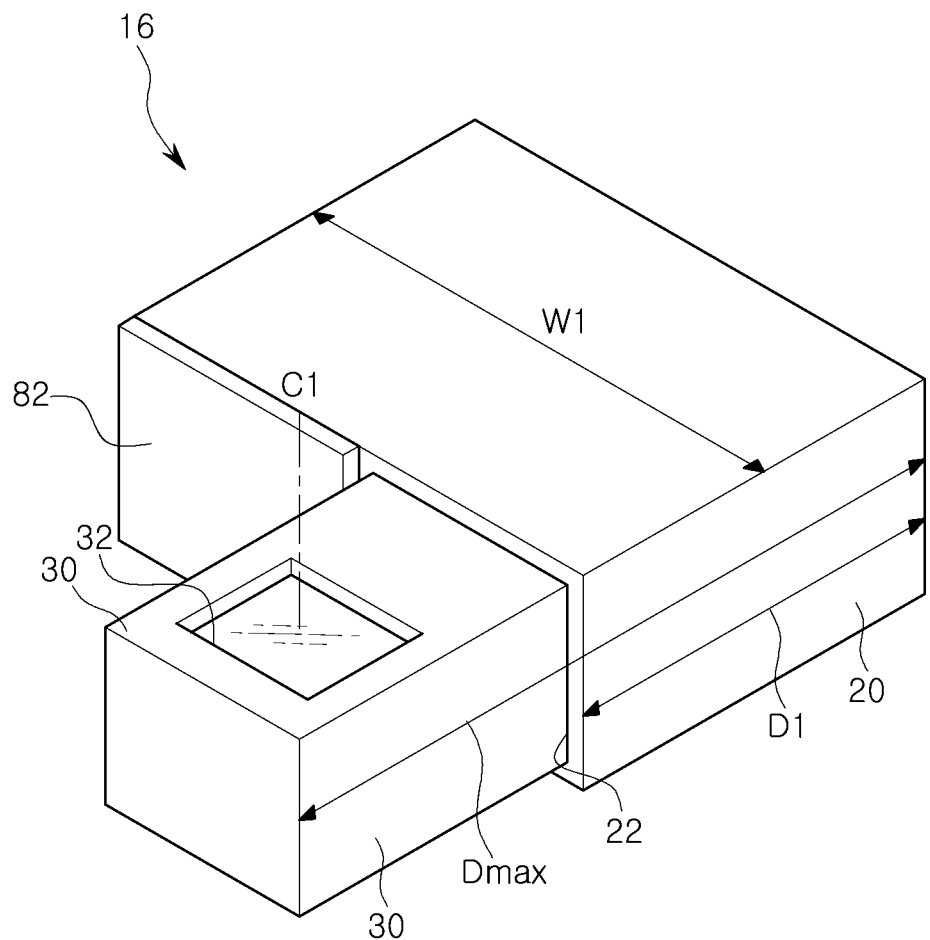
FIG. 10 is a perspective view of the camera module according to even another example embodiment.
Figure 11:
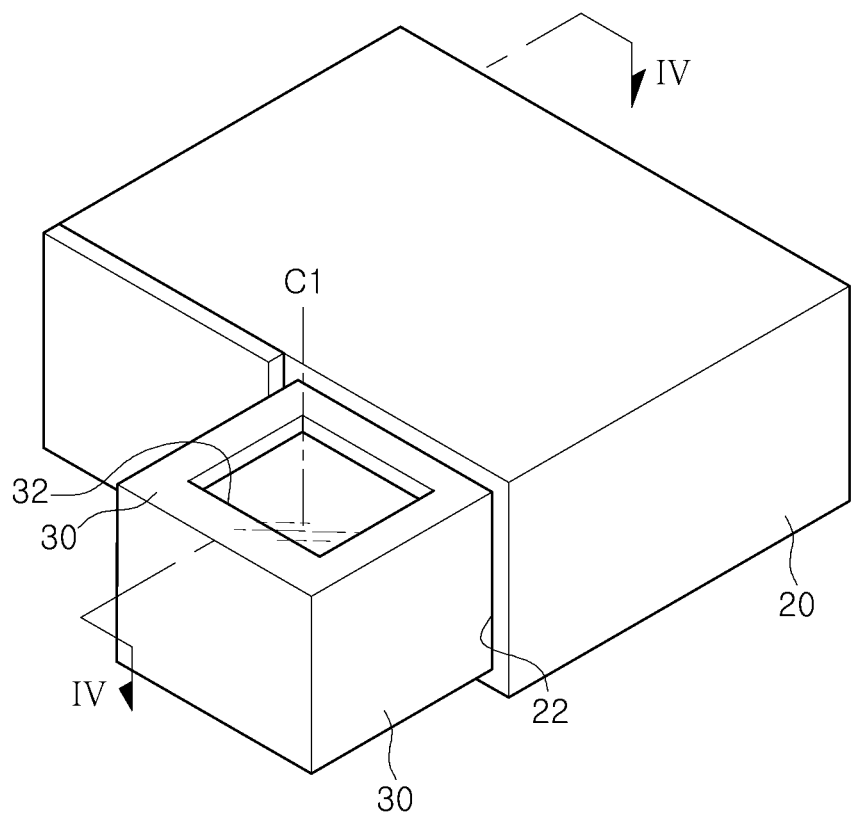
FIG. 11 is a view illustrating an operating state of the camera module illustrated in FIG. 10.

Next, a camera module according to yet another example embodiment is described with reference to FIGS. 7 through 9.

Figure 7:
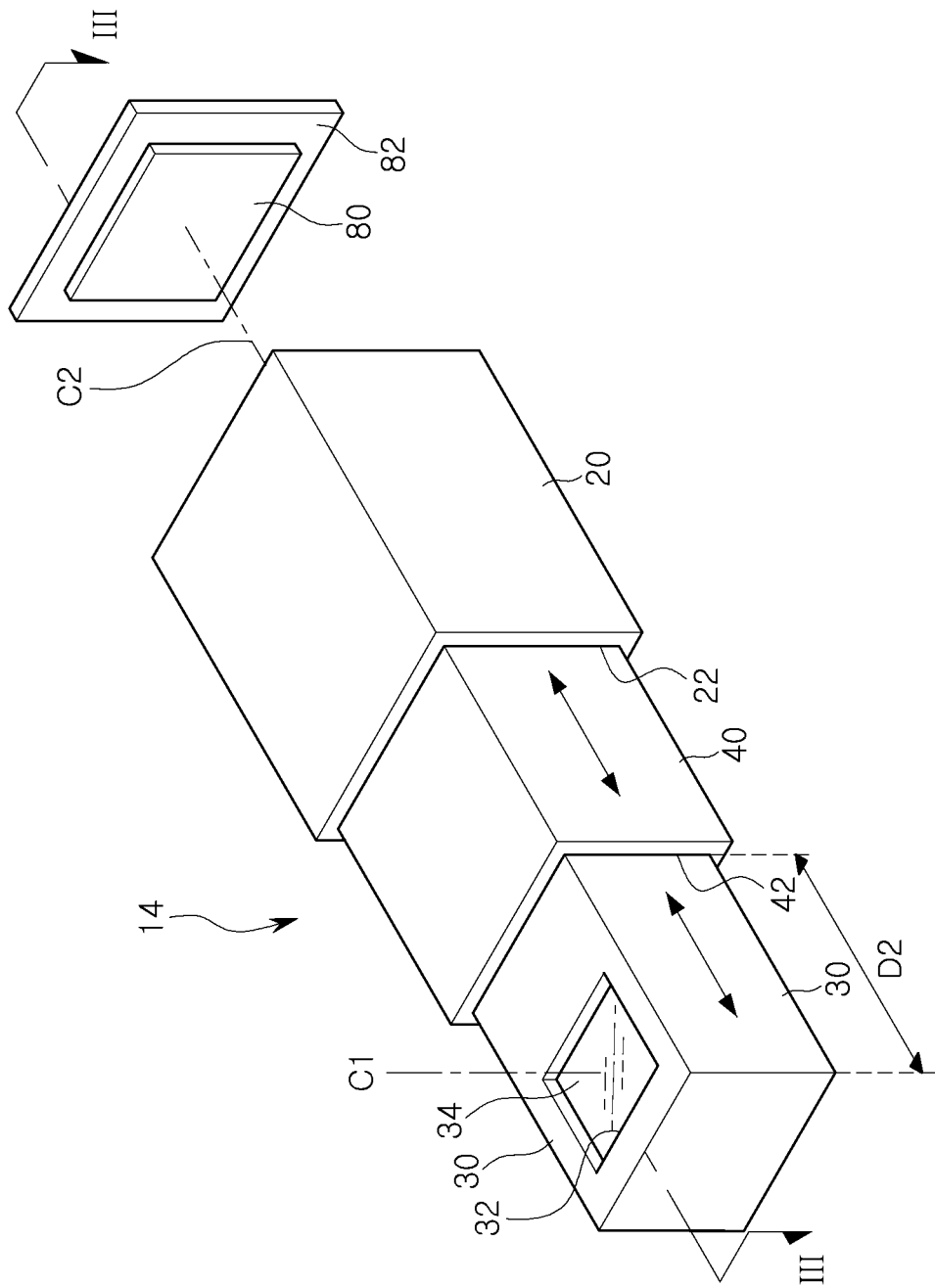
FIG. 7 is a perspective view of a camera module according to yet another example embodiment.

A camera module 14 according to this example embodiment may further increase the length variable in one direction (i.e., direction of the second optical axis C2 in FIG. 7). For example, the camera module 14 may include a plurality of housings 30 and 40 which may be moved in the direction of the second optical axis C2.

The camera module 14 may include the first housing 20, the second housing 30 and the third housing 40. The first housing 20 to the third housing 40 may be sequentially disposed along the direction of the second optical axis C2. For example, the camera module 14 may have the first housing 20, the third housing 40 and the second housing 30, which are sequentially connected with each other. The first housing 20, the second housing 30 and the third housing 40 may have the sizes different from one another. For example, the cross section (i.e., plane intersecting the second optical axis C2) of the first housing 20 may be greater than the cross sections of the second housing 30 and the third housing 40, and the cross section of the third housing 40 may be greater than the cross section of the second housing 30.

The second housing 30 and the third housing 40 may be carried into and carried out of the adjacent housing. For example, the third housing 40 may be carried into the first housing 20 through the opening 22 of the first housing 20 or may be carried out of the inside of the first housing 20. For another example, the second housing 30 may be carried into the third housing 40 through an opening 42 of the third housing 40 or may be carried out of the inside of the third housing 40.

Therefore, the camera module 14 according to this example embodiment may greatly vary the length of the camera module 14 in one direction by using carried-in and-out amounts of each of the second housing 30 and the third housing 40. For example, a maximum length of the camera module 14 may be D1+D2+D3 obtained by summing the lengths of the first housing 20 to the third housing 40, and a minimum length of the camera module 14 may be D1+D22+D32 obtained by partially adding or subtracting the lengths of the first housing 20 to the third housing 40.

The camera module 14 configured as described above may greatly vary the length of the camera module 14 by using the plurality of housings 30 and 40, thus making it easy to adjust the focus magnification.

Next, an internal structure of the camera module 14 according to this example embodiment is described with reference to FIG. 9.

The camera module 14 may include the first optical path conversion member 52, the imaging optical system 60, the image sensor 80 and the board 82. The first optical path conversion member 52, the imaging optical system 60 and the image sensor 80 may be disposed in the first housing 20 or the second housing 30. For example, some components (e.g., third lens L3) of the image sensor 80 and the imaging optical system 60 may be disposed in the first housing 20, and the rest of the components (e.g., first lens L1 and second lens L2) of the first optical path conversion member 52 and the imaging optical system 60 may be disposed in the second housing 30. For reference, FIG. 9 shows that no component is disposed in the third housing 40. However, it may be possible to dispose some components of the imaging optical system 60 in the third housing 40 as needed.

Next illustrated is a perspective view of a camera module according to another example embodiment with reference to FIGS. 10 through 13.

A camera module 16 according to this example embodiment may form a long optical path. For example, the camera module 16 according to this example embodiment may form the optical path longer than a maximum length (Dmax) of the camera module 16.

The camera module 16 may include the first housing 20 and the second housing 30. The first housing 20 may have significant sizes W1 and D1 in the first and second directions each intersecting the first optical axis C1.

Figure 12:
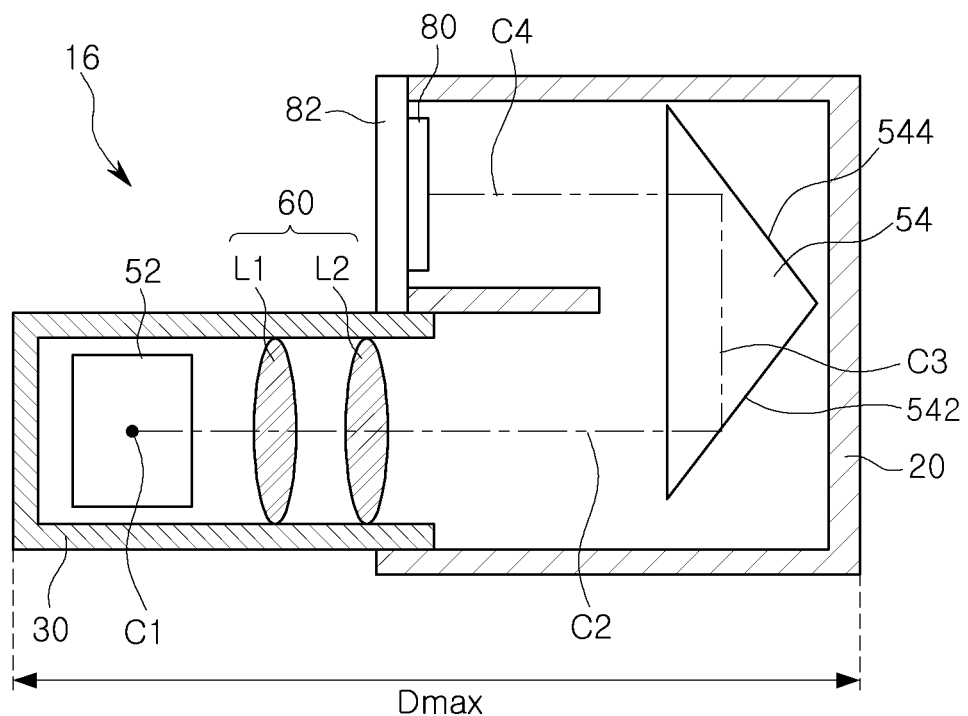
FIG. 12 is a cross-sectional view of the camera module illustrated in FIG. 10.
Figure 13:
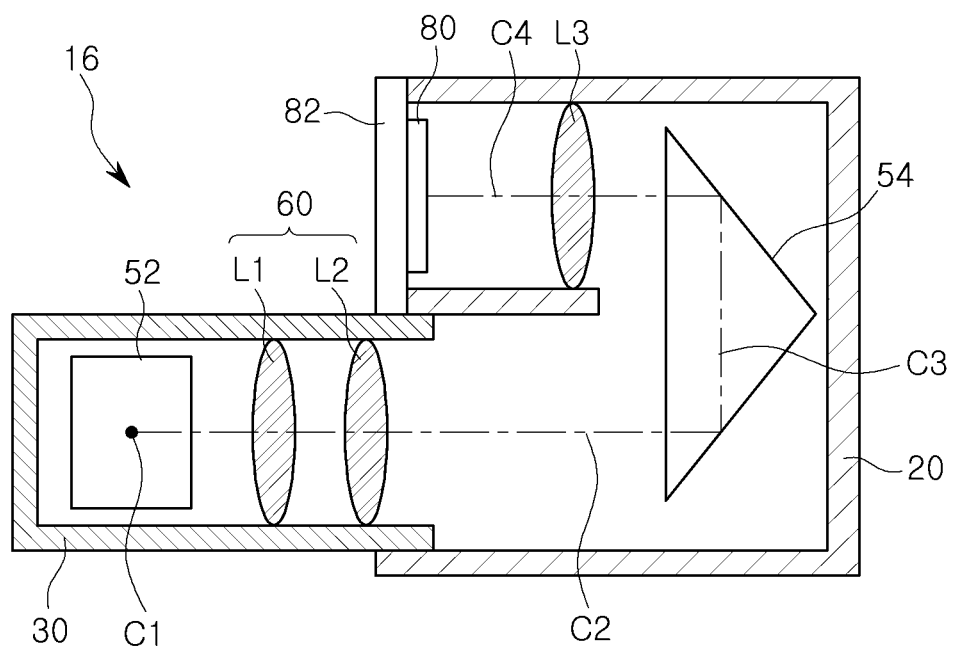
FIG. 13 is a cross-sectional view of a modified type of the camera module illustrated in FIG. 10.
Figure 14:
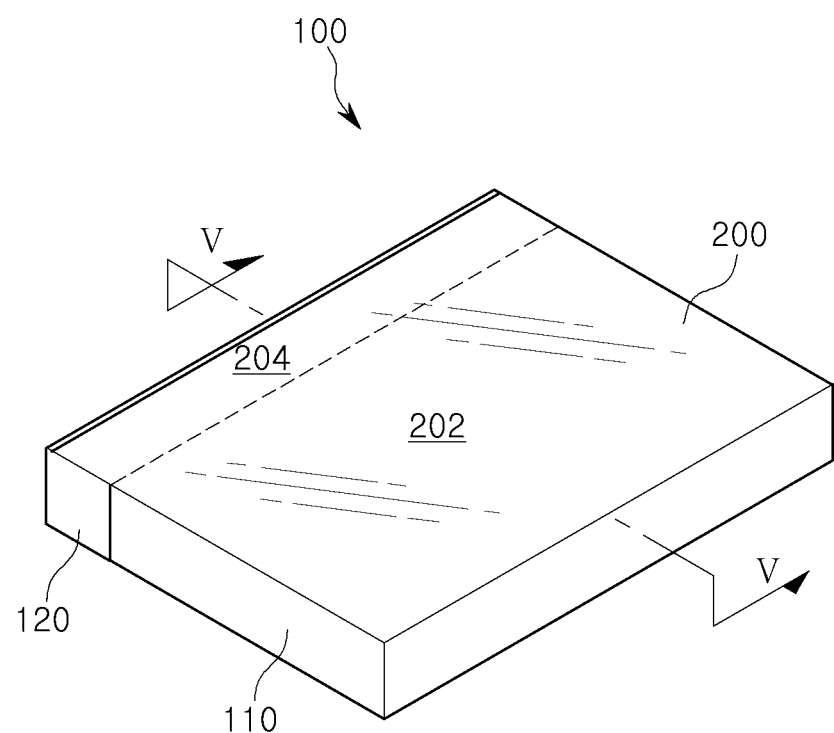
FIG. 14 is a perspective view of an electronic device according to an example embodiment.

The first housing 20 and the second housing 30 may accommodate main components of the camera module 16. For example, the first housing 20 may accommodate a second optical path conversion member 54 and the image sensor 80 as illustrated in FIG. 12, and the second housing 30 may accommodate the first optical path conversion member 52 and the imaging optical system 60 (i.e., lenses L1 and L2). However, not only the components described above may be accommodated in the first housing 20 and the second housing 30. For example, a lens L3 of the imaging optical system 60 may be further disposed in the first housing 20 as illustrated in FIG. 13.

The camera module 16 may have the variable length. For example, the second housing 30 may be carried into the first housing 20 through the opening 22 of the first housing 20 or carried out of the first housing 20 through the opening 22 of the first housing 20, thereby varying the length or size of the camera module 16.

The camera module 16 may have the long focal length or the long optical path. For example, a distance from the incident surface or emission surface of the first optical path conversion member 52 to the image sensor 80 may be greater than the maximum length Dmax of the camera module 16. For another example, a distance from an object-side of a foremost lens (i.e., first lens L1 in FIG. 12) of the imaging optical system 60 to the image sensor 80 may be greater than the maximum length Dmax of the camera module 16. For another example, a distance from an image-side of a rearmost lens (i.e., second lens L2 in FIG. 12) of the imaging optical system 60 to the image sensor 80 may be substantially equal to or greater than the maximum length Dmax of the camera module 16.

The optical path of the camera module 16 may be formed by the optical path conversion members 52 and 54. For example, a first optical path may be formed along the second optical axis C2 connecting a first reflective surface 542 of the second optical path conversion member 54 and a reflective surface of the first optical path conversion member 52 with each other, a second optical path may be formed along a third optical axis C3 connecting the first reflective surface 542 of the second optical path conversion member 54 and a second reflective surface 544 of the second optical path conversion member 54 with each other, and a third optical path may be formed along a fourth optical axis C4 connecting the second reflective surface 544 of the second optical path conversion member 54 and the image sensor 80 with each other.

The camera module 16 configured as above may secure a significant distance from the first optical path conversion member 52 to the image sensor 80, and may thus include the imaging optical system 60 including the plurality of lenses, the imaging optical system 60 having the long focal length or the imaging optical system 60 including a plurality of lens groups.

Next, an electronic device according to an example embodiment is described with reference to FIGS. 14 through 17.

An electronic device 100 according to this example embodiment may be the portable terminal. For example, the electronic device 100 may be a mobile phone, a tablet personal computer (PC), the laptop computer or the like. However, the electronic device 100 is not limited to the aforementioned type such as the mobile phone, the tablet PC, or the laptop computer.

The electronic device 100 according to this example embodiment may include a display member 200. For example, the electronic device 100 may include the display member 200 capable of visually displaying an output signal or a signal input unit (e.g., string or symbol). A type of the display member 200 may be a quantum dot light-emitting diode (QLED), an active matrix organic light emitting diode (AMOLED), a light-emitting diode (LED), a liquid crystal display (LCD), a thin film transistor (TFT), a plasma display panel (PDP) or the like. However, the type of the display member 200 is not limited to the QLED, the AMOLED, the LED, the LCD, the TFT, or the PDP. The display member 200 may be bent. For example, at least a region 204 of the display member 200 may be rolled or folded in a predetermined shape by elastic expression.

Figure 15:
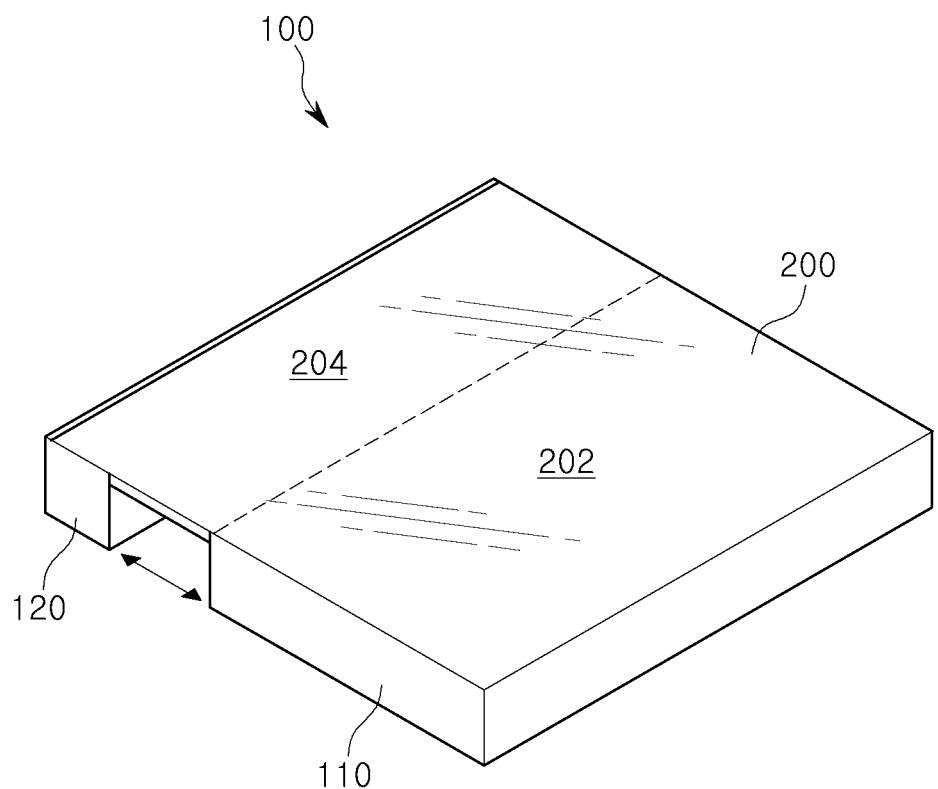
FIG. 15 is a view illustrating an operating state of the electronic device illustrated in FIG. 14.

The electronic device 100 may include a plurality of bodies 110 and 120. For example, the electronic device 100 may include the first body 110 and the second body 120. The first body 110 and the second body 120 may be coupled to each other and separated from each other. For example, the second body 120 may be positioned to be in close contact with one surface of the first body 110 or spaced apart from one surface of the first body 110 to maintain a considerable distance from the first body 110 as illustrated in FIG. 15.

The first body 110 and the second body 120 may accommodate electronic components necessary for performing a function of the electronic device 100. For example, the first body 110 may include a control device capable of transmitting an output signal to the display member 200 or receiving a command signal input through the display member 200. In addition, the first body 110 may include electronic components necessary to perform a main function and an additional function of the electronic device 100.

The first body 110 and the second body 120 may partially accommodate the display member 200. For example, the first body 110 may accommodate a first region 202 of the display member 200, and the second body 120 may accommodate a second region 204 of the display member 200.

Figure 16:
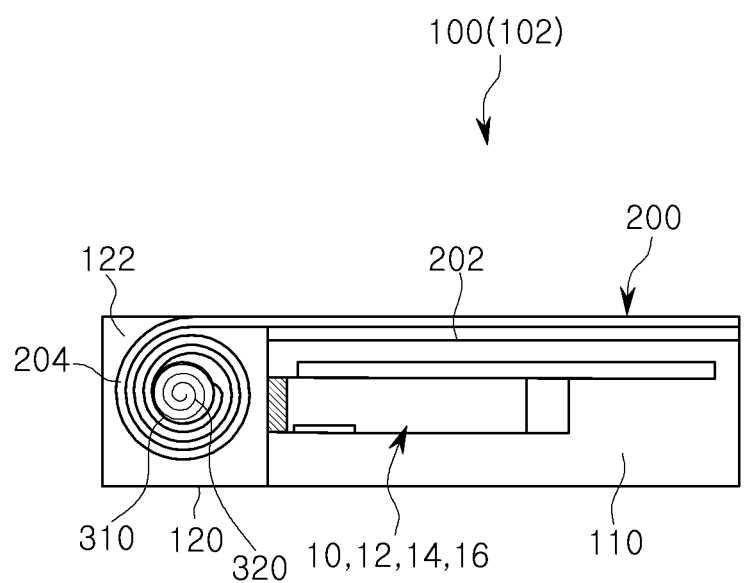
FIGS. 16 and 17 are respective cross-sectional views of the electronic device illustrated in FIGS. 14 and 15.
Figure 17:
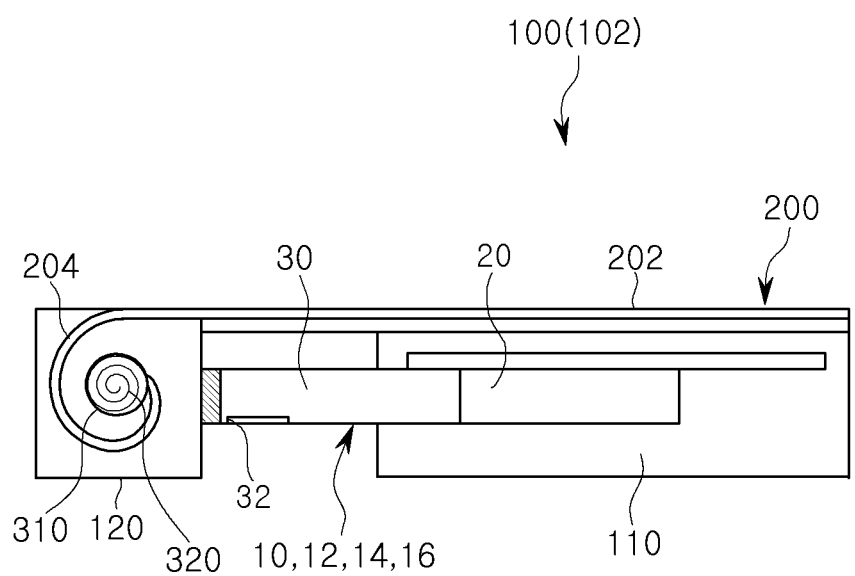
Figure 18:
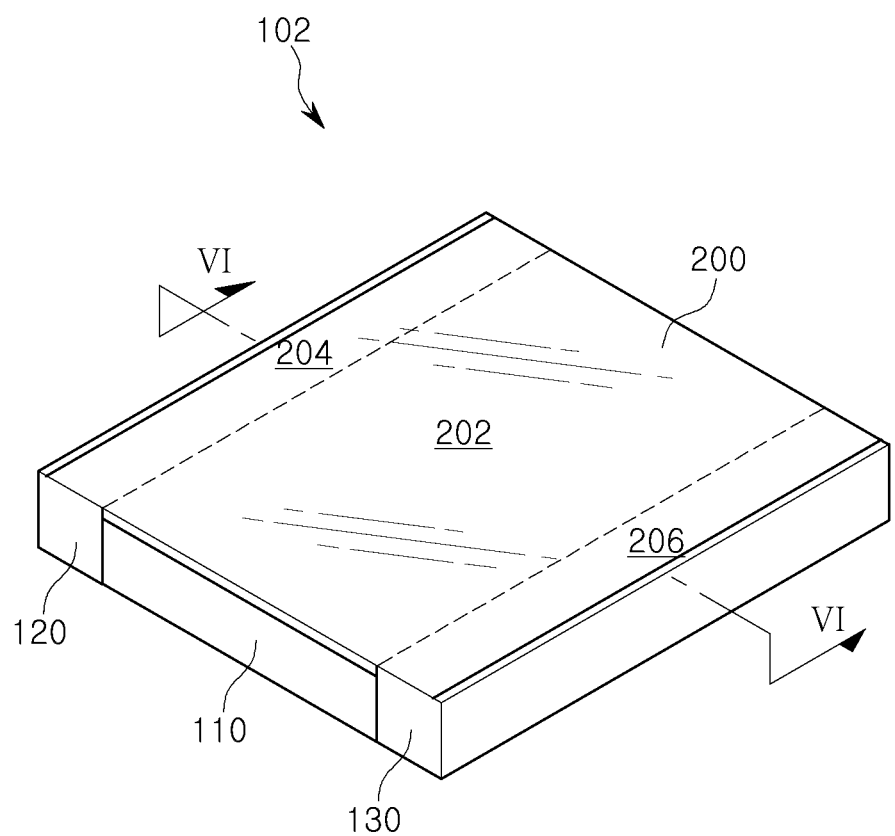
FIG. 18 is a perspective view of an electronic device according to another example embodiment.

The second body 120 may accommodate the second region 204 of the display member 200 therein. For example, the second body 120 may include a wound member wound at the second region 204 of the display member 200 as illustrated in FIGS. 16 and 17. The wound member may include a roll member 310 and an elastic member 320. However, the wound member is not limited to include the roll member 310 and the elastic member 320. The roll member 310 may be connected to one end of the display member 200. For example, the roll member 310 may be connected to the second region 204 of the display member 200.

Accordingly, when the roll member 310 is rotated, the second region 204 of the display member 200 may be wound on a surface of the roll member 310. The elastic member 320 may provide a rotational inertia force to the roll member 310. For example, the elastic member 320 may provide a rotational force to the roll member 310 so that the roll member 310 maintains the second region 204 in a wound state.

A storage space 122 storing the second region 204 of the display member 200 may be formed in the second body 120. For example, in a state where the first body 110 and the second body 120 are in close contact with each other, the second region 204 of the display member 200 may be rolled on the roll member 310 to be accommodated in the storage space 122 of the second body 120. On the other hand, in a state where the first body 110 and the second body 120 are separated from each other, the second region 204 of the display member 200 may be unrolled on the roll member 310 to be out of the storage space 122 of the second body 120.

In the electronic device 100 configured as described above, the region of the display member 200 may be reduced or expanded as necessary, thus providing a large output screen to the user without increasing an actual size of the electronic device 100.

The electronic device 100 according to this example embodiment may include the camera module. For example, the electronic device 100 may have a shape of one of the camera modules 10, 12, 14, and 16 described herein or a combined shape of two or more camera modules 10, 12, 14, and 16 described herein. However, the shape of the camera module 10, 12, 14, or 16 included in the electronic device 100 is not limited to the shape described herein. For example, the electronic device 100 according to this example embodiment may include another type of a combined or coupled shape of the camera modules 10, 12, 14, and 16 described herein.

The camera modules 10, 12, 14, or 16 may be connected to the first body 110 and the second body 120 as illustrated in FIGS. 16 and 17. For example, the first housing 20 of the camera module 10, 12, 14, or 16 may be fixed to the first body 110, and the second housing 30 may be connected to the second body 120. Therefore, the length of the camera module 10, 12, 14, or 16 may be reduced or extended according to a distance between the first body 110 and the second body 120. The window 32 of the camera module 10, 12, 14, or 16 may be exposed externally from the electronic device 100. For example, in a state where the first body 110 and the second body 120 are spaced apart from each other, light reflected from the subject may be incident on the imaging optical system 60 and the image sensor 80 of the camera module 10, 12, 14, or 16 through the window 32 of the camera module 10, 12, 14, or 16.

The electronic device 100 configured as above may adjust the distance by which the first body 110 and the second body 120 are spaced apart from each other to adjust not only the length of the camera module 10, 12, 14, or 16 but also the focal magnification or focal length of the camera module 10, 12, 14, or 16. Therefore, the electronic device 100 according to this example embodiment may include the camera module (i.e., telephoto camera module) having the long focal length without allocating a separate space therein.

Next, an electronic device according to another example embodiment is described with reference to FIGS. 18 through 21.

Figure 19:
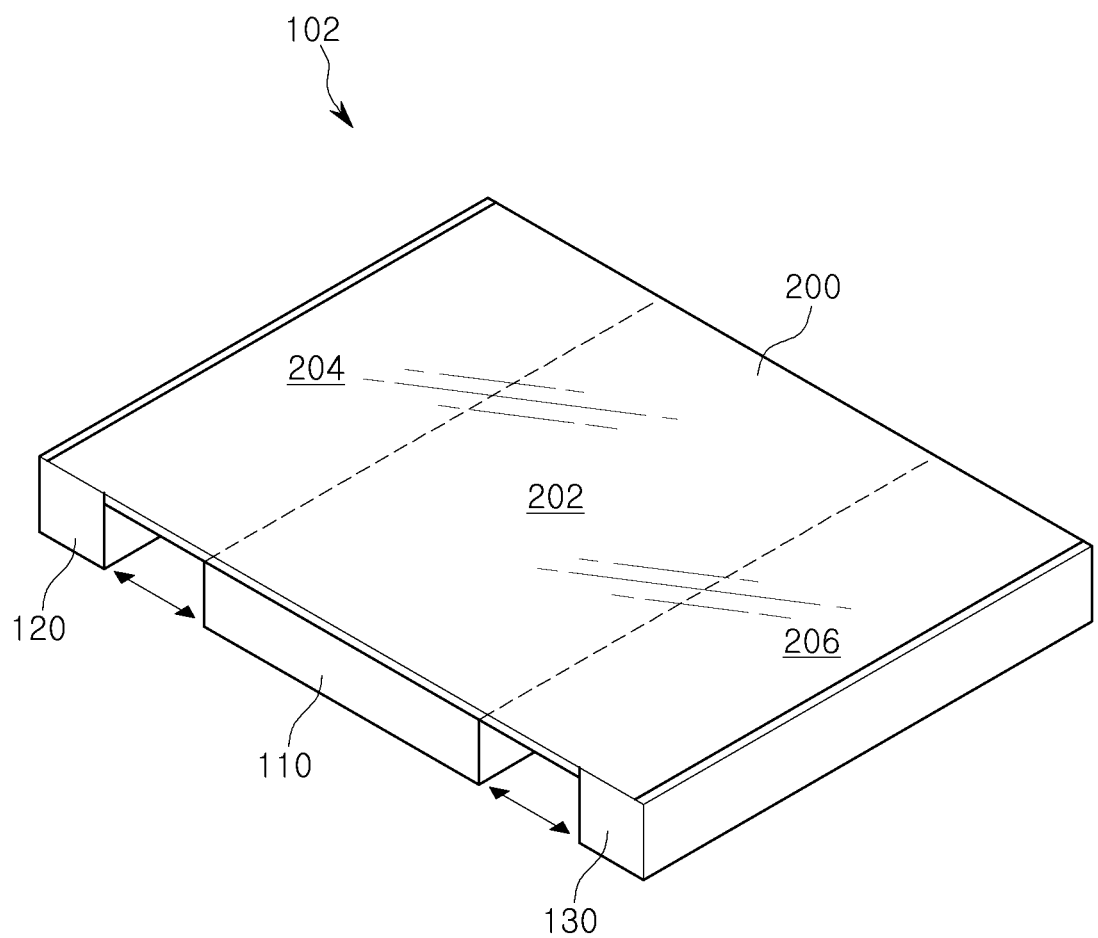
FIG. 19 is a view illustrating an operating state of the electronic device illustrated in FIG. 18.

An electronic device 102 according to this example embodiment may include a plurality of bodies 110, 120, and 130. For example, the electronic device 102 may include the first body 110, the second body 120, and the third body 130. The second body 120 and the third body 130 may be coupled to the first body 110 or separated from the first body 110. For example, the second body 120 and the third body 130 may respectively be positioned to be in close contact with one surface and the other surface of the first body 110 or spaced apart from one surface and the other surface of the first body 110 to maintain a considerable distance from the first body 110 as illustrated in FIG. 19.

The first body 110 may accommodate the electronic components necessary for performing the function of the electronic device 102. For example, the first body 110 may include the control device capable of transmitting the output signal to the display member 200 or receiving the command signal input through the display member 200. In addition, the first body 110 may include the electronic components necessary to perform the main function and the additional function of the electronic device 102.

The first body 110, the second body 120, and the third body 130 may partially accommodate the display member 200. For example, the first body 110 may accommodate the first region 202 of the display member 200, the second body 120 may accommodate the second region 204 of the display member 200, and the third body 130 may accommodate a third region 206 of the display member 200.

Figure 20:
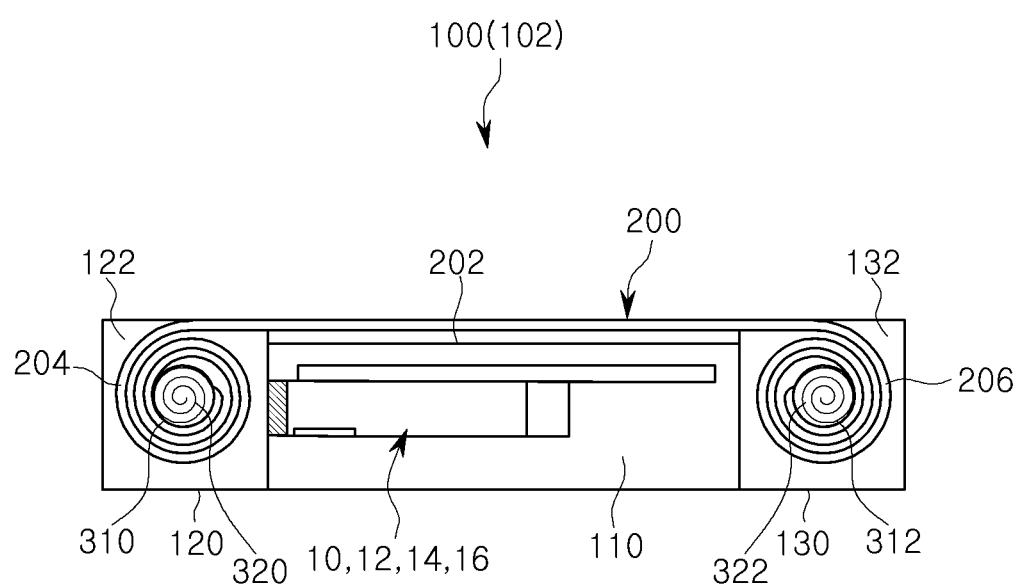
FIGS. 20 and 21 are respective cross-sectional views of the electronic device illustrated in FIGS. 18 and 19.
Figure 21:
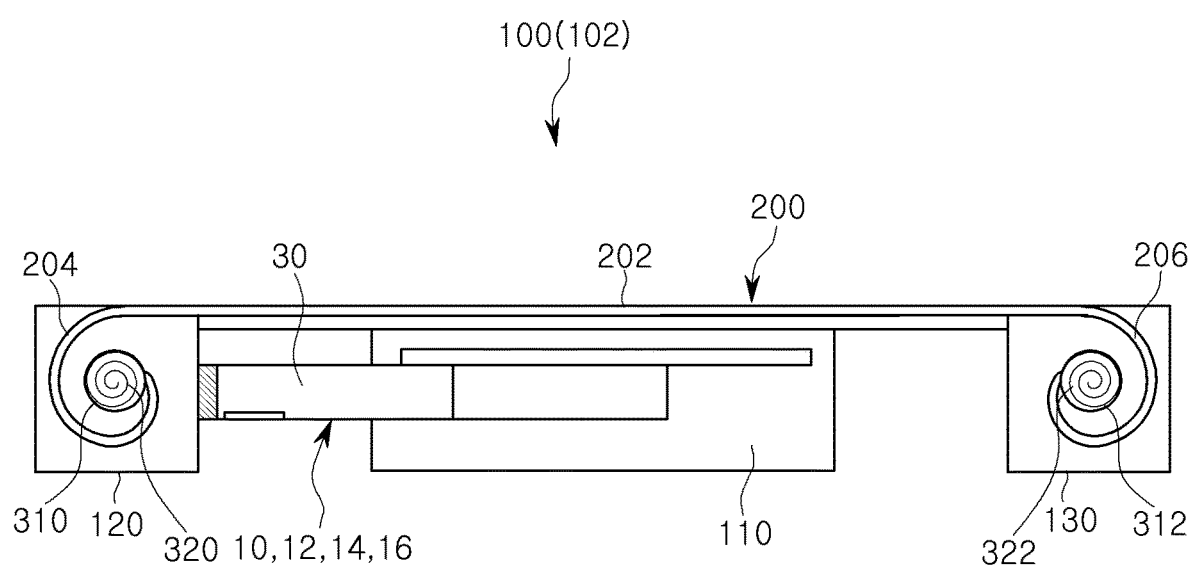

The second body 120 and the third body 130 may respectively accommodate the second region 204 and the third region 206 of the display member 200 therein. For example, the second body 120 and the third body 130 may each include the wound member as illustrated in FIGS. 20 and 21. The wound member may include roll members 310 and 312 and elastic members 320 and 322. However, the wound member is not limited to include the roll members 310 and 312 and the elastic members 320 and 322. The roll members 310 or 312 may be connected to each end of the display member 200. For example, the roll members 310 and 312 may respectively be connected to the second region 204 and the third region 206 of the display member 200. Accordingly, when the roll members 310 and 312 are rotated, the second region 204 and the third region 206 of the display member 200 may respectively be wound on surfaces of the roll members 310 and 312. The elastic members 320 and 322 may provide the rotational inertia forces to the roll members 310 and 312. For example, the elastic members 320 and 322 may provide the rotational forces to the roll members 310 and 312 so that the roll members 310 and 312 maintain the second region 204 and the third region 206 in the wound states. Storage spaces 122 and 132 respectively storing the second region 204 and the third region 206 of the display member 200 may respectively be formed in the second body 120 and the third body 130.

In the electronic device 102 configured as described above, the region of the display member 200 may be reduced or expanded as necessary, thus providing the large output screen to the user without increasing the actual size of the electronic device 102.

The electronic device 102 according to this example embodiment may include the camera module. For example, the electronic device 102 may have the shape of one of the camera modules 10, 12, 14, and 16 described herein or the combined shape of two or more camera modules 10, 12, 14, and 16 described herein. However, the shape of the camera module 10, 12, 14, or 16 included in the electronic device 102 is not limited to the shape described herein. For example, the electronic device 102 according to this example embodiment may include another type of a combined or coupled shape of the camera modules 10, 12, 14, and 16 described herein.

The camera modules 10, 12, 14, or 16 may be connected to the first body 110 and the second body 120 or the first body 110 and the third body 130, as illustrated in FIGS. 20 and 21. For example, the first housing 20 of the camera module 10, 12, 14, or 16 may be fixed to the first body 110, and the second housing 30 may be connected to the second body 120. Therefore, the length of the camera module 10, 12, 14, or 16 may be reduced or extended according to the distance between the first body 110 and the second body 120. The window 32 of the camera module 10, 12, 14, or 16 may be exposed externally from the electronic device 102. For example, in a state where the first body 110 and the second body 120 are spaced apart from each other, light reflected from the subject may be incident on the imaging optical system 60 and the image sensor 80 of the camera module 10, 12, 14, or 16 through the window 32 of the camera module 10, 12, 14, or 16.

The electronic device 102 configured as above may adjust the distance by which the first body 110 to the third body 130 are spaced apart from one another to adjust not only the length of the camera module 10, 12, 14, or 16 but also the focal magnification or focal length of the camera module 10, 12, 14, or 16. Therefore, the electronic device 102 according to this example embodiment may include the plurality of camera modules (i.e., telephoto camera modules) each having the long focal length without allocating a separate space therein.

As set forth above, the present disclosure may provide the camera module capable of the telephoto imaging.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a first housing comprising an image sensor converting an optical signal into an electrical signal; and
   a second housing comprising an imaging optical system focusing the optical signal on the image sensor and a first optical path conversion member disposed on an object-side surface of the imaging optical system and converting an optical path, and carried into or carried out of the first housing in a state of being coupled to the first housing.

2. The camera module of claim 1, wherein the imaging optical system comprises a focal length "f" varied by a movement of the second housing.

3. The camera module of claim 1, wherein the first housing and the second housing have lengths different from each other in a direction of an optical axis of the imaging optical system.

4. The camera module of claim 1, wherein the imaging optical system comprises a lens having an effective radius in a first direction intersecting the optical axis and an effective radius in a second direction intersecting the optical axis and the first direction, which are different from each other.

5. The camera module of claim 1, wherein the first housing comprises a second optical path conversion member.

6. An electronic device comprising the camera module of claim 1.

7. The electronic device of claim 6, further comprising:
   a first body connected to the first housing, and comprising a first region of a display member; and
   a second body movably disposed relative to the first body, and comprising a second region of the display member,
   wherein the second region exposes a greater area of the display member when the second body is moved away from the first body.

8. The electronic device of claim 7, wherein the second body is connected to the second housing.

9. An electronic device comprising:
   a first body comprising a first region of a display member;
   a second body comprising a variable distance from the first body and comprising a second region of the display member; and
   a camera module comprising a first housing connected to the first body, and a second housing connected to the second body and carried into or carried out of the first housing based on a position of the second body,
   wherein the first housing comprises an image sensor converting an optical signal into an electrical signal, and
   wherein the second housing comprises an imaging optical system focusing the optical signal on the image sensor and a first optical path conversion member converting a path of light incident in an opening of the second housing to the imaging optical system.

10. The electronic device of claim 9, wherein the second body comprises a wound member wound at the second region of the display member.

11. The electronic device of claim 10, wherein the wound member comprises:
    a roll member connected to one end of the display member and capable of performing a rotational movement based on a fixed axis; and
    an elastic member providing an inertial force for rotating the roll member in one direction.

12. The electronic device of claim 10, wherein the second region of the display member is an elastic member providing an inertial force for rotating the second region of the display member in one direction.

13. The electronic device of claim 9, further comprising a third body having a variable distance from the first body and comprising a third region of the display member.

14. The electronic device of claim 9, wherein the imaging optical system comprises a lens having an effective radius in a first direction intersecting an optical axis and an effective radius in a second direction intersecting the optical axis and the first direction, which are different from each other.

15. The electronic device of claim 9, wherein the second housing comprises a second optical path conversion member.

16. A camera module comprising:
a first housing;
a second housing comprising a window; and
an imaging optical system comprising one or more lenses disposed in the second housing or the first and second housings, focusing incident light through the window on an image sensor of the first housing,
wherein the second housing is carried into or carried out of the first housing in a state of being coupled to the first housing.

17. The camera module of claim 16, further comprising a first optical path conversion member converting a path of light incident in the window of the second housing to the imaging optical system.

18. The camera module of claim 16, wherein a focal length "f" of the imaging optical system is varied by movement of the second housing relative to the first housing.

19. An electronic device comprising:
the camera module of claim 16;
a first body connected to the first housing, and comprising a first region of a display member; and
a second body movably disposed relative to the first body, and comprising a second region of the display member,
wherein the second region is exposed when the second body is moved away from the first body and is stored when the second body is moved towards the first body.

20. The electronic device of claim 19, wherein the second body is connected to the second housing.

* * * * *